(12) United States Patent
Heissler et al.

(10) Patent No.: US 8,113,812 B2
(45) Date of Patent: Feb. 14, 2012

(54) VALVE PIN BUSHING ASSEMBLY FOR AN INJECTION MOLDING APPARATUS

(75) Inventors: Uwe Heissler, Baden-Baden (DE); Harold Godwin, Fergus (CA); Douglas Ursu, Orangeville (CA)

(73) Assignee: MOld-Masters (2007) Limited, Georgetown, Ontario (CA)

( * ) Notice: Subject to any disclaimer, the term of this patent is extended or adjusted under 35 U.S.C. 154(b) by 26 days.

(21) Appl. No.: 12/669,276

(22) PCT Filed: Jul. 17, 2008

(86) PCT No.: PCT/CA2008/001325
§ 371 (c)(1),
(2), (4) Date: Mar. 14, 2010

(87) PCT Pub. No.: WO2009/009903
PCT Pub. Date: Jan. 22, 2009

(65) Prior Publication Data
US 2010/0209547 A1    Aug. 19, 2010

Related U.S. Application Data

(60) Provisional application No. 60/950,334, filed on Jul. 17, 2007.

(51) Int. Cl.
*B29C 45/23*    (2006.01)
(52) U.S. Cl. ............... 425/151; 264/572; 264/328.12
(58) Field of Classification Search ........... 425/151, 425/572; 264/328.8
See application file for complete search history.

(56) References Cited

U.S. PATENT DOCUMENTS

| 4,808,106 | A | 2/1989 | von Holdt | |
| 5,269,673 | A | * 12/1993 | Kempf et al. | ........... 425/151 |
| 7,172,409 | B2 | 2/2007 | Tabassi | |
| 2006/0153945 | A1 | 7/2006 | Blais et al. | |

FOREIGN PATENT DOCUMENTS

| CA | 2 329 706 A1 | 10/1999 |
| CA | 2 591 730 A1 | 12/2007 |
| DE | 133643 | 1/1979 |
| NL | 1026839 C2 | 2/2006 |

OTHER PUBLICATIONS

International Search Report for Int'l Appl No. PCT/CA2008/001325.
Int'l Preliminary Examination Report for Appl No. PCT/CA2008/001325, Jan. 19, 2010.
"Membrane Actuator", *Ewikon Brochure* Nov. 2004.
Written Opinion for Int'l Appl No. PCT/CA2008/001325, Oct. 7, 2008.

* cited by examiner

*Primary Examiner* — Timothy Heitbrink
(74) *Attorney, Agent, or Firm* — Medler Ferro PLLC

(57) ABSTRACT

A valve pin bushing assembly for an injection molding apparatus. The assembly includes a bushing body for connection to a manifold, a flexible barrier having a first end that is continuously connected to the bushing body, and a valve pin continuously connected to a second end of the flexible barrier. The valve pin extends through a nozzle in a downstream direction towards a mold gate, wherein the valve pin is movable in an upstream direction and in the downstream direction for opening and closing the mold gate. The flexible barrier seals a channel of molding material from an outside space.

29 Claims, 17 Drawing Sheets

VALVE PIN BUSHING ASSEMBLY FOR AN INJECTION MOLDING APPARATUS

This application claims priority to and the benefit of U.S. Patent application Ser. No. 60/950,334, filed Jul. 17, 2007, the entire contents of which are hereby incorporated by reference.

FIELD OF THE INVENTION

This invention relates to an injection molding apparatus, and more particularly to a valve pin bushing assembly for a hot runner.

BACKGROUND OF THE INVENTION

In an injection molding apparatus having a hot half with a hot runner, a movable valve pin can be used to control flow of molding material (e.g., plastic melt) through a nozzle. A portion of the valve pin extends into a melt channel to control the flow of molding material, and a portion of the valve pin extends outside the melt channel for connection to an actuating mechanism.

Typically, a valve pin bushing is installed in a manifold to guide the movement of the valve pin and seal against leakage of molding material out of the melt channel. Sealing generally requires strict tolerances.

Regarding sealing, a hole in the valve pin bushing, through which the pin moves, typically wears over time from the cycling of the valve pin, and eventually, the gap between the valve pin and the hole grows to permit leakage of molding material therethrough. Leakage can be in the form of melt, melt residue, or gasses, any of which can damage the molding apparatus or pollute the environment. Leaking melt and melt residue can also seize the pin in the valve pin bushing, preventing the injection molding apparatus from operating properly. Once the leakage is excessive, the valve pin bushing must be refurbished or replaced along with any other damaged equipment.

SUMMARY

According to one example embodiment there is provided a valve pin bushing assembly for an injection molding apparatus. The assembly includes a bushing body for connection to a manifold, a flexible barrier having a first end that is continuously connected to the bushing body, and a valve pin continuously connected to a second end of the flexible barrier. The valve pin extends through a nozzle in a downstream direction towards a mold gate, wherein the valve pin is movable in an upstream direction and in the downstream direction for opening and closing the mold gate. The flexible barrier seals a channel of molding material from an outside space.

According to another example embodiment there is provided an injection molding apparatus that includes a back plate, an actuator connected to the back plate, a mold plate, a manifold disposed between the back plate and the mold plate, the manifold having a manifold channel, a nozzle connected to the manifold and disposed in a well of the mold plate, the nozzle having a nozzle channel in communication with the manifold channel, and a valve pin bushing assembly. The valve pin busing assembly includes a bushing body connected to the manifold, a flexible barrier having a first end that is continuously connected to the bushing body, and a valve pin continuously connected to a second end of the flexible barrier and extending in a downstream direction towards a mold gate. The valve pin is movable in an upstream direction and in the downstream direction, and the flexible barrier seals a channel of molding material from an outside space.

According to another example embodiment there is provided an injection molding apparatus that includes one or more plates, an actuator connected to the one or more plates, a manifold disposed among the one or more plates, the manifold having a manifold channel and a heater, a nozzle connected to the manifold, the nozzle having a nozzle channel in communication with the manifold channel and a heater, and a valve pin bushing assembly. The valve pin busing assembly includes a bushing body secured to the manifold, a generally cylindrical leak-proof flexible barrier continuously connected to the bushing body; and a valve pin continuously connected to the flexible barrier and extending in a downstream direction towards a mold gate. The valve pin is movable in an upstream direction and in the downstream direction to open and close the mold gate, and the flexible barrier seals a channel of molding material from an outside space.

BRIEF DESCRIPTION OF THE FIGURES

Embodiments of the present invention will now be described more fully with reference to the accompanying drawings in which:

FIG. 6 is a schematic diagram of the flexible barrier of FIG. 2a;

DETAILED DESCRIPTION OF EXAMPLE EMBODIMENTS OF THE INVENTION

Figure 1:
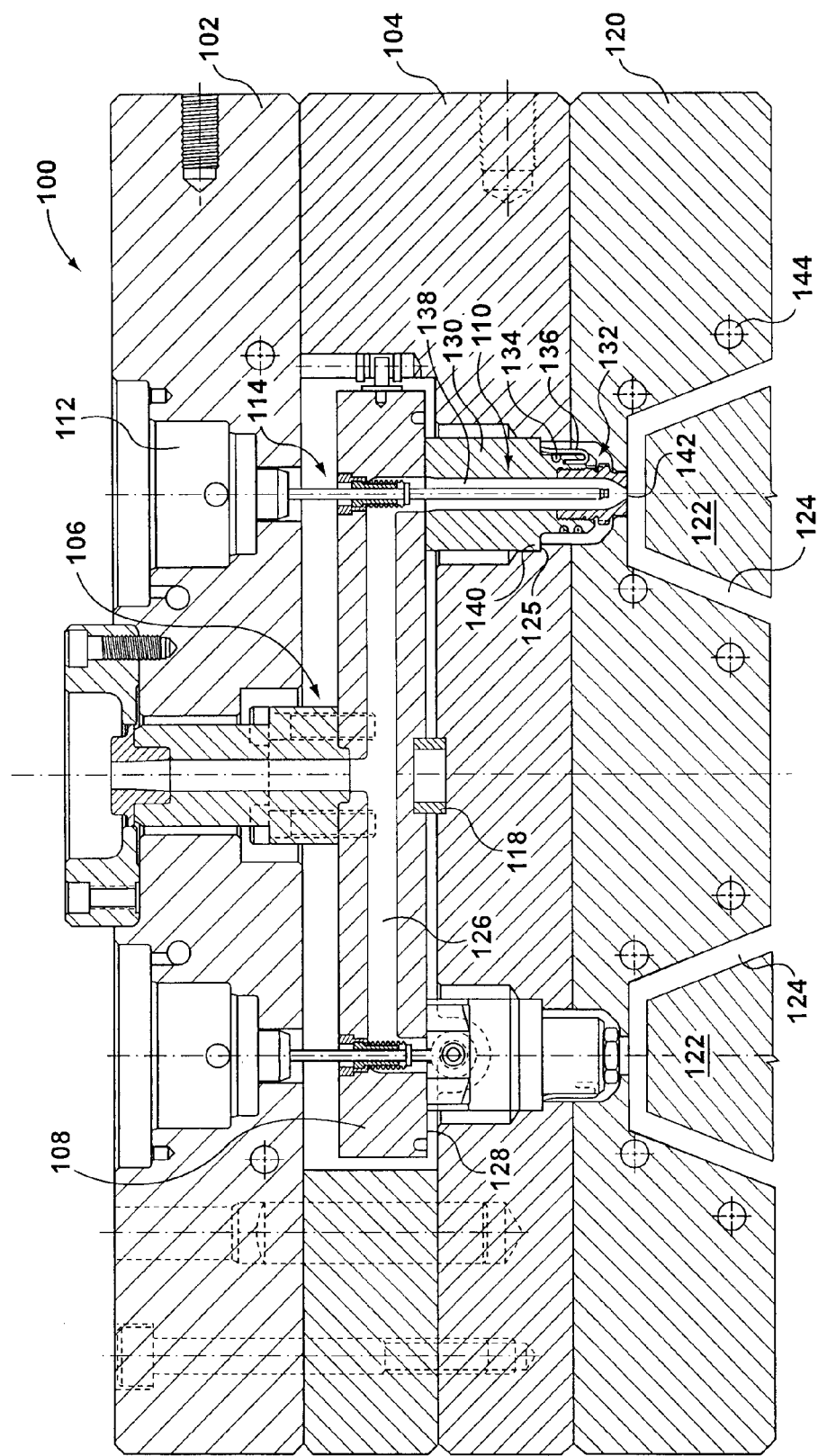
FIG. 1 is a partial sectional view of a hot half for an injection molding apparatus according to an embodiment of the present invention.

FIG. 1 shows a hot half 100 for an injection molding apparatus according to an embodiment of the present invention. The features and aspects described for the other embodiments can be used accordingly with the present embodiment.

The hot half 100 includes a back plate 102, a mold plate 104, an inlet 106, a manifold 108, nozzles 110, actuators 112, valve pin bushing assemblies 114, and a locating ring 118. The hot half 100 is coupled to a cavity plate 120 in which core parts 122 are situated to define mold cavities 124 where molded products are formed. The hot half 100 can include additional plates and other well-known components, such as bolts, alignment dowels, electrical connectors, mold gate inserts, and so on. The hot half 100 may also include the cavity plate 120, depending on the specific configuration.

The back plate 102 can have cavities in which the actuators 112 are disposed. The back plate 102 can also have cooling channels through which cooling fluid can be circulated, which can help keep the actuators 112 and other temperature sensitive equipment at acceptable operating temperatures. The back plate 102 is but one example of common back plates that can be used in the hot half 100.

The mold plate 104 can be shaped to contain the manifold 108. The mold plate 104 can further have wells for containing the nozzles 110, which can include shoulders 125 for supporting the nozzles 110. The mold plate 104 is but one example of common mold plates that can be used in the hot half 100. Additional mold plates can also be used, depending on the specific configuration.

The inlet 106 includes a sprue bushing, an inlet channel, and other well-known components for delivering molding material (e.g., plastic melt) to the manifold 108.

The manifold 108 is disposed between the back plate 102 and the mold plate 104. The manifold 108 has a manifold channel 126 in communication with the inlet channel for delivering molding material from the inlet 106 to the nozzles 110. The manifold 108 can also have a manifold heater 128, which can be any known type of heater, such as an electrical resistance heater wire.

Each nozzle 110 has a nozzle body 130 and a nozzle tip 132. A nozzle heater 134, such as an electrical resistance heater wire, and a thermocouple 136 can be installed on the nozzle body 130. The nozzle 110 has a nozzle channel 138 running therethrough. The nozzles 110 are coupled to the manifold 108 such that the manifold channel 126 is in communication with the nozzle channels 138. The nozzle body 130 can include a shoulder 140 that contacts the shoulder 125 of the mold plate 104 to support the nozzle 110. The nozzle tip 132 has a mold gate 142 that is opened and closed by a valve pin (ref. 206 of FIG. 2). As long as one heater (i.e., heaters 128, 134) is provided, the nozzles 110 in combination with the manifold 108 can be termed a hot runner; however, this term is fairly loosely defined in the art and other parts may also be included when this term is used by those skilled in the art.

The actuators 112 are disposed in the back plate 102 and control the positions of the valve pins. The actuators 112 can be hydraulic, pneumatic, electrical, or any other design.

The valve pin bushing assemblies 114 are connected to the manifold 108. The valve pin bushing assemblies 114 serve to seal against leakage of molding material from the manifold channel 126 and/or the nozzle channel 138 to the outside space between the manifold 108 and the plates 102, 104. The valve pin bushing assemblies 114 may also be designed to guide the valve pins to align with the mold gates 142. The valve pin bushing assemblies 114 will be discussed in more detail later.

The locating ring 118 is situated between the manifold 108 and the mold plate 104 and serves to locate and/or support the manifold 108. The locating ring 118 is an example of a means for supporting the manifold 108 and the heated nozzles 110 between the back plate 102 and the mold plate 104. The above-mentioned inlet 106 and shoulders 140, 125 are another example of such means for supporting. These and other known means for supporting can be used alone or in combination.

The cavity plate 120 can include cooling channels 144 for circulating cooling fluid.

Figure 2A:
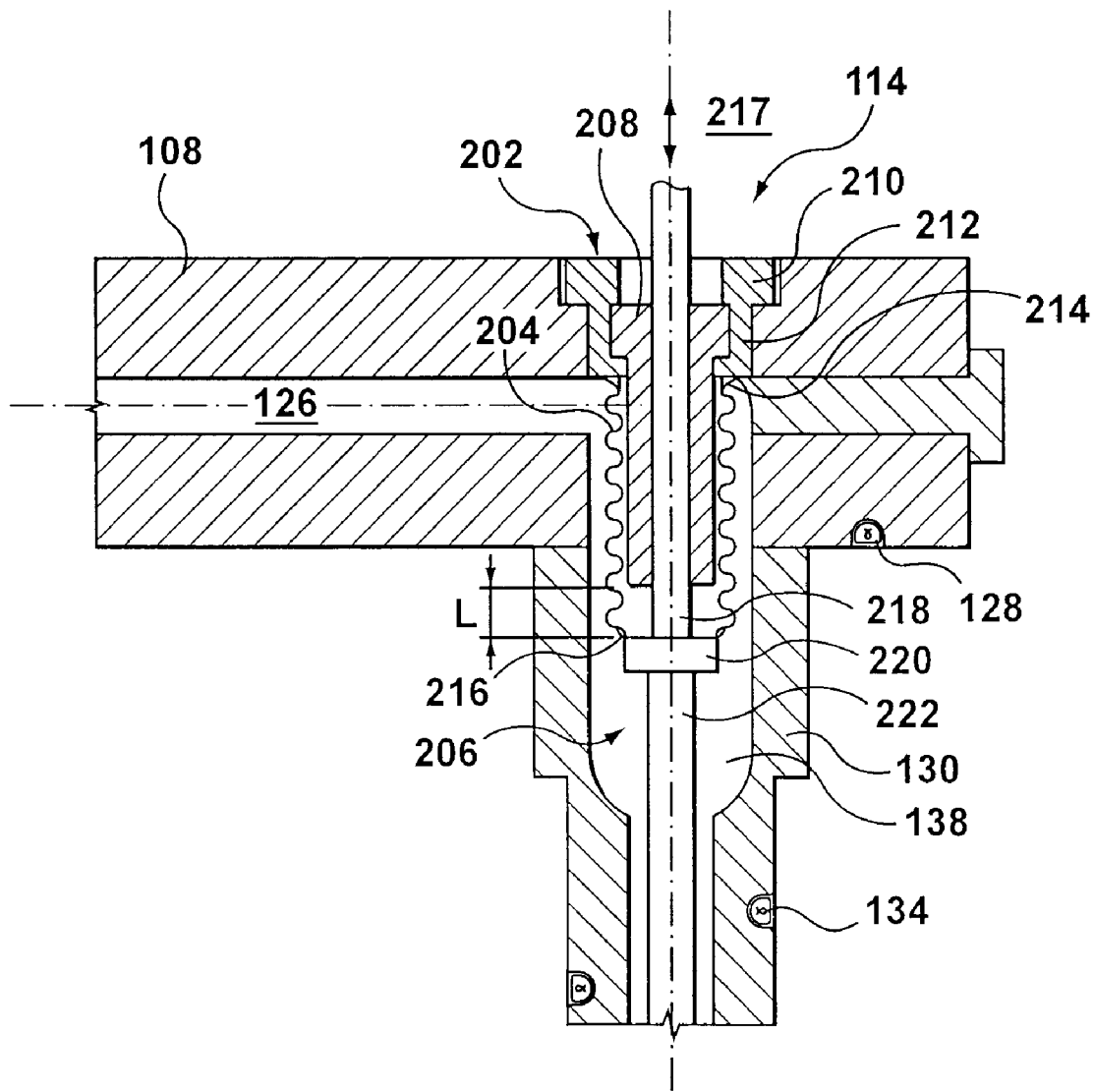
FIG. 2a is a cross-sectional view of the valve pin bushing assembly of FIG. 1.

FIG. 2a is a cross-sectional view showing the valve pin bushing assembly 114. The valve pin bushing assembly 114 comprises a bushing body 202, a flexible barrier 204, a valve pin 206, and a support tube 208.

The bushing body 202 is installed in a recess of the manifold 108 and can be secured to the manifold 108 by a thread or other means. The bushing body 202 includes an upper portion 210 and a lower portion 212, which secure the top of the support tube 208 therebetween. The upper portion 210 and lower portion 212 can be threaded together. Other means of connecting the bushing body 202 to the manifold 108 and connecting the upper portion 210 and lower portion 212 together include mechanical means, such as shrink fitting and interference fitting, and metallurgical means, such as brazing, welding, and soldering. Such connections can be permanent or readily separable.

The flexible barrier 204 extends from the bushing body 202 into the manifold channel 126 and/or the nozzle channel 138, depending on the specific configurations of these channels. In this embodiment, the flexible barrier 204 is a bellows, that is, the flexible barrier 204 is generally cylindrical in shape, is thin walled, and has a series of circumferential convolutions (undulations, ripples). The wall of the flexible barrier 204 is thin enough so that the convolutions allow longitudinal extension and contraction without permanent deformation. For example, the flexible barrier 204 can be a stainless steel bellows with a wall thickness inclusively between 0.2 and 0.3 mm. The length of the flexible barrier 204 depends on how much travel of the valve pin 206 is required and the flexibility of the flexible barrier 204. Since the flexible barrier 204 is spring-like, similar design principles can be used when calculating its dimensions and elastic range of extension/contraction.

The flexible barrier 204 has a first end 214 that is continuously connected to the bushing body 202. The flexible barrier 204 also has a second end 216 that is continuously connected to the valve pin 206. Such continuous connections can be achieved by laser welding, for example. Other acceptable connection methods include mechanical connections, such as shrink fitting, interference fitting, and using an adhesive, and metallurgical connections, such as brazing, welding, and soldering. A main requirement for the continuous connections of the first end 214 to the bushing body 202 and the second end 216 to the valve pin 206 is that they be leak proof, meaning that molding material cannot pass through the connections. Continuously connected means any connection that does not have a leak path for molding material, but such a connection is not necessarily hermetically sealed. The lack of a leak path from the manifold channel 126 and/or the nozzle channel 138 to outside space 217 means that the flexible barrier 204 provides sealing against leakage of molding material superior to conventional valve pin bushings that rely on a seal being established between moving parts (i.e., a moving seal).

The valve pin 206 extends in an upstream direction towards the actuator 112 and in a downstream direction towards the mold gate 142. The valve pin 206 includes an upper portion 218, a middle portion 220, and a lower portion 222. The upper portion 218 is connected to the actuator 112 and extends downstream through the support tube 208 to connect to the middle portion 220. The middle portion 220 has a diameter larger than the upper portion 218 and the lower portion 222 and is continuously connected to the second end 216 of the flexible barrier 204. The lower portion 222 extends downstream to the mold gate 142 and can be of any design, such as cylindrical, tapered, or stepped. The valve pin 206 can be made from one piece or can be made from several pieces joined together. These pieces may be made of the same or different materials. For example, the material of the upper portion 218 could be selected to improve the bond/weld between the valve pin 206 and the flexible barrier 204. In another example, the lower portion 222 could be made of a material better for wear resistance to improve its durability against the molding material and seating in the mold gate 142. In another embodiment, the upper portion 218 of the valve pin 206 is not joined to the middle portion 220, so that the actuator 112 can only move the valve pin 206 downstream by pushing the upper portion 218 against the middle portion 220. In this case, pressure of the molding material moves the valve pin 206 upstream.

The support tube 208 surrounds the upper portion 218 of the valve pin 206 from the bushing body 202 to near the middle portion 220 of the valve pin. The outside diameter of the support tube 208 is smaller than the inside clear diameter of the flexible barrier 204, and thereby supports the flexible barrier 204 against collapse due to pressure of the molding material, which may exceed 2,000 bar (29,000 psi), for example. The mechanism of collapse of generally cylindrical bodies, such as the flexible barrier 204, is well known, and a skilled designer should take this into account when designing the length required for the support tube 208; however, the support tube 208 should leave some length, L, of the flexible barrier 204 unsupported to allow for contraction of the flexible barrier 204 and travel of the valve pin 206. It should be noted that strict dimensional tolerances are not required on the inner diameter of the support tube 208, since the support tube 208 is isolated from the melt by the flexible barrier 204.

Manufacturing the valve pin bushing assembly 114 can be achieved by various conventional processes. The upper and lower portions 210, 212 of the bushing body 202 and the support tube 208 can be turned. The upper and lower portions 210, 212 of the bushing body 202 and the support tube 208 can be made of three separate pieces as described, can be integrated into one or two pieces, or made of more than three pieces. The valve pin 206 can be made using rod stock, with the larger diameter middle portion 220 being attached by welding or shrink fitting, for example. Bellows for use as the flexible barrier 204 are generally commercially available, but if custom designs are required, techniques such as electroforming and hydroforming, among others, can be used. Metal bellows suitable for use as the flexible barrier 204 are manufactured by HEITZ GmbH of Rheinstetten, Germany, among others. Any material could be used for the bellows as long as such material offers sufficient elastic expansion/contraction, sufficient resistance to collapse due to pressure of the molding material, and sufficient chemical compatibility with the molding material. The manufacturing processes described above do not preclude use of others, and a skilled designer can select a suitable process for a particular design. Suitable materials for the valve pin bushing assembly 114 have been described above, but it should be mentioned that many materials used in injection molding apparatuses are expected to be amenable to being used to make the valve pin bushing assembly 114.

Regarding disassembly, the valve pins 206 can be detachable from the pistons of the actuators 112 to allow removal of the actuators 112 and the back plate 102 to expose the valve pin bushing assemblies 114 for maintenance or removal. The reverse is true for assembly. This and other options will be discussed later.

In operation, the valve pin bushing assembly 114 behaves much like a conventional valve pin bushing assembly, but with much less chance of leakage. One notable difference in operation is that the spring-like behavior of the flexible barrier 204 will bias the position of the valve pin 206. By selecting appropriate lengths for the flexible barrier 204 and the valve pin 206, the bias can be designed to be towards fully opening the mold gate 142, fully closing the mold gate 142, or putting the valve pin 206 in any position between. It should be noted that extra actuator force may be required based on such bias. In one example, the valve pin 206 is biased to open the mold gate 142, requiring enough actuator force to close the valve pin 206 against both molding material pressure and the spring contraction force of the flexible barrier 204. In another example, the valve pin 206 is biased to close the mold gate 142, requiring less actuator force to close the mold gate 142. When biasing to close the mold gate 142, the pressure of the molding material tends to counteract the extension spring force of the flexible barrier 204. Further to this, if the average pressure of the molding material is known, the flexible barrier 204 can be designed to allow the valve pin 206 to float in a state where the spring force of the flexible barrier 204 is roughly balanced by the molding material average pressure. Such a balanced design might be suitable for an application where a more forceful actuator cannot be used or in a retrofit where it would be best if the valve pin bushing assembly 114 could behave much like the old assembly to be replaced. It should be noted that the force applied to the valve pin 206 by the molding material pressure is larger than just the pressure acting on the tip of the valve pin 206; this force also includes pressure acting on the projected area of the downstream face of the middle portion 220 of the valve pin 206 and pressure acting on the convolutions of the flexible barrier 204, and can be readily calculated or estimated.

Figure 2B:
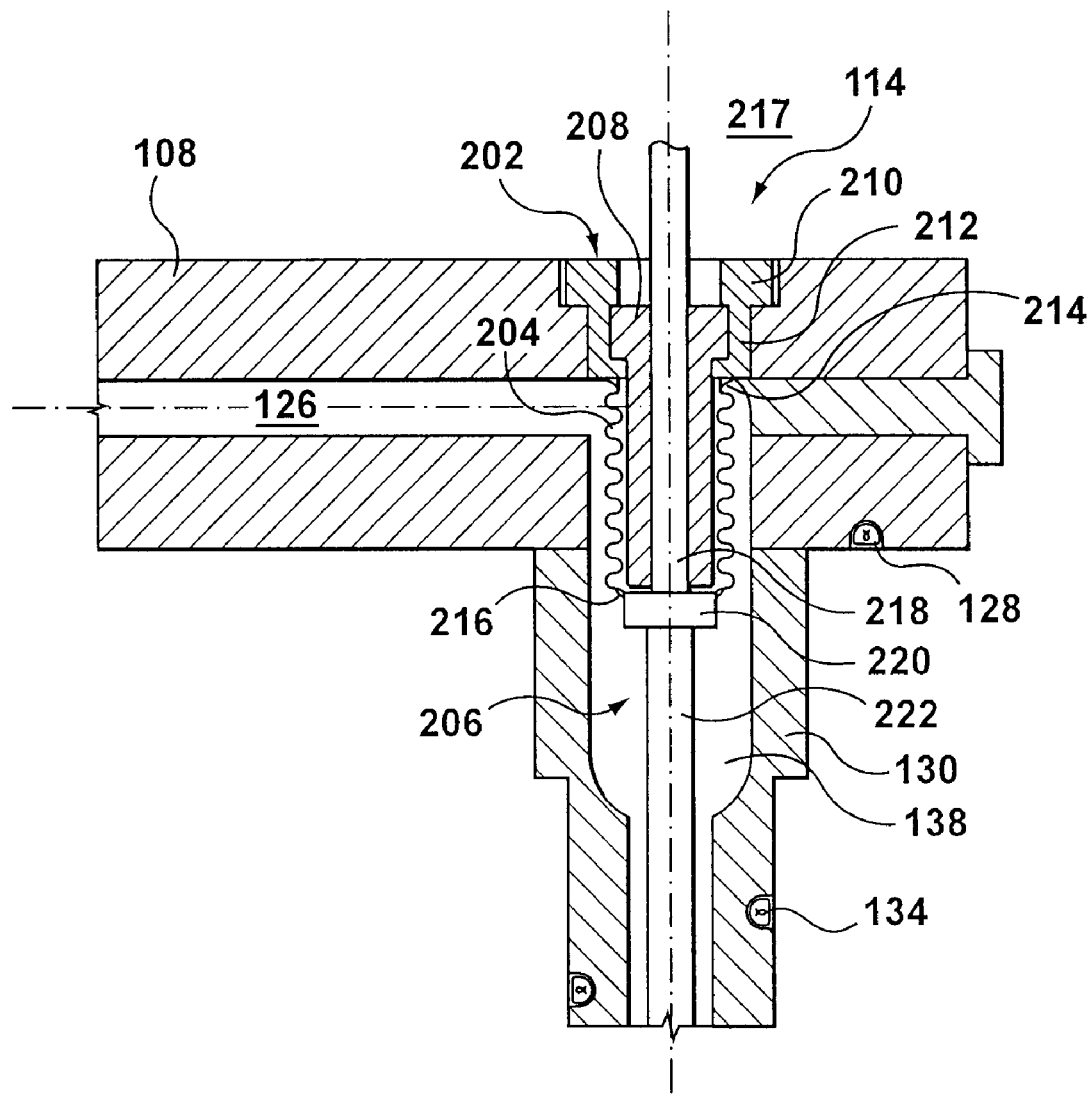
FIG. 2b is a cross-sectional view of the valve pin bushing assembly of FIG. 1 with the valve pin in another position.

FIG. 2b shows the flexible barrier 204 contracted and the valve pin 206 moved upwards. Such position would open the mold gate 142.

Figure 3:
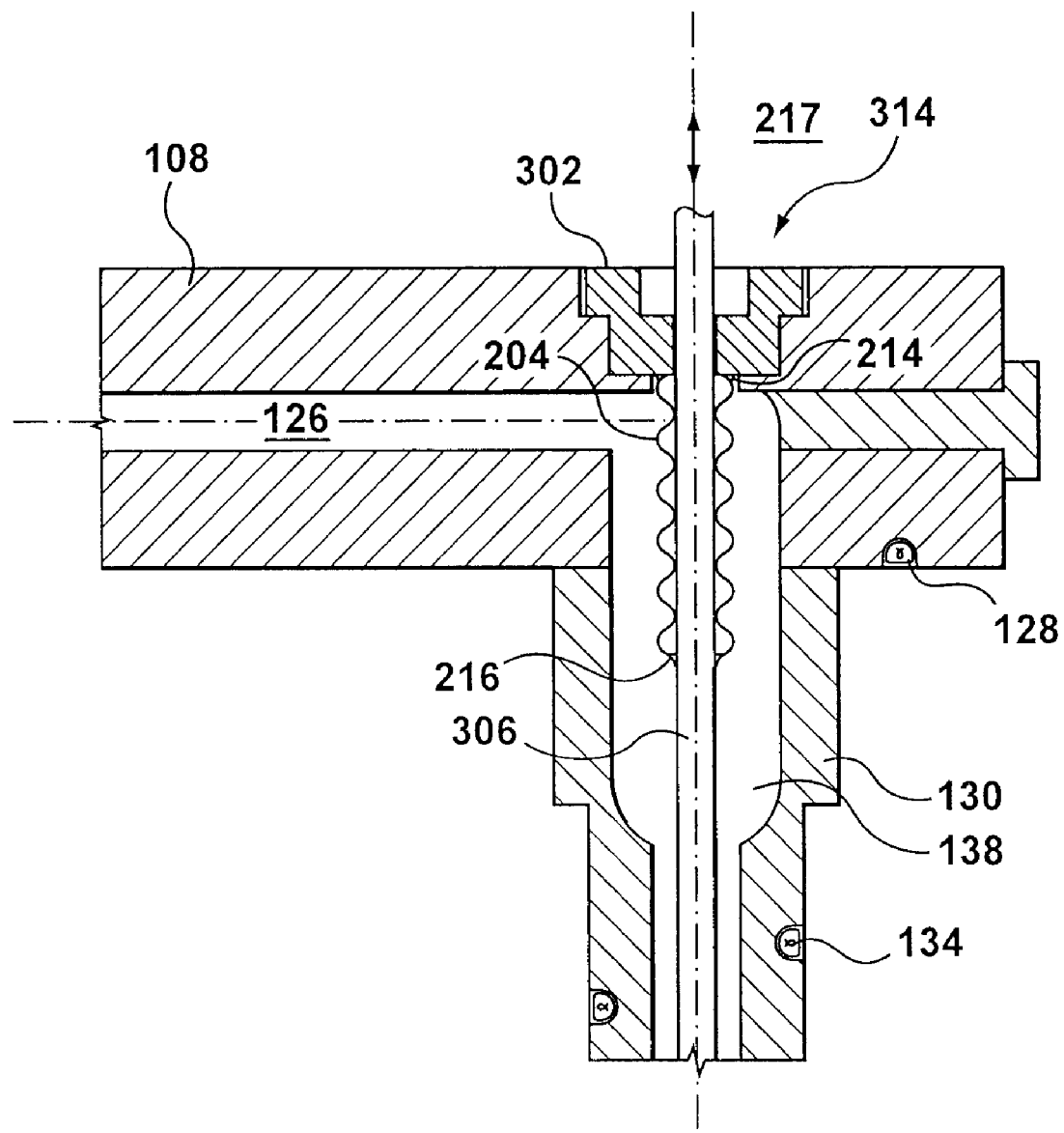
FIG. 3 is a cross-sectional view of a valve pin bushing assembly without a support tube according to another embodiment of the present invention.

FIG. 3 shows a valve pin bushing assembly 314 without a support tube according to another embodiment of the present invention. In the description of this embodiment, like reference numerals are used to describe like parts for ease of understanding. Only differing features and aspects of the present embodiment are described in detail in order to avoid repetition. For description of the like parts, methods of manufacturing, methods of operation, and advantages, the other embodiments can be referenced. In addition, the features and aspects described for the other embodiments can be used accordingly with the present embodiment.

The valve pin bushing assembly 314 comprises a bushing body 302, a flexible barrier 204, and a valve pin 306.

The bushing body 302 is installed in a recess of the manifold 108 and can be secured to the manifold 108 by a thread or other means. Other means of connecting the bushing body 302 to the manifold 108 include mechanical means, such as shrink fitting and interference fitting, and metallurgical means, such as brazing, welding, and soldering. Such connections can be permanent or readily separable.

The flexible barrier 204 extends from the bushing body 302 into the manifold channel 126 and/or the nozzle channel 138. In this embodiment, the flexible barrier 204 is a bellows much the same as previously described with respect to FIG. 2, other than that the clear inner diameter of the flexible barrier 204 is matched to the outer diameter of the valve pin 306 and collapse of the flexible barrier 204 due to pressure of the molding material is prevented by the valve pin 306. In addition, as can be seen, valve pin travel is not limited by a support tube; instead the maximum travel is limited by the permissible extension and compression of the flexible barrier 204.

The first end 214 of the flexible barrier 204 is continuously connected to the bushing body 302, and the second end 216 of the flexible barrier 204 is continuously connected to the valve pin 306. Such continuous connections have been described above with reference to FIG. 2.

The valve pin 306 extends in an upstream direction towards an actuator (e.g., actuator 112) and in a downstream direction towards a mold gate (e.g., mold gate 142) and can be of any design, such as cylindrical, tapered, or stepped. In the proximity of the valve pin bushing assembly 314, the valve pin 306 has a uniform diameter to which the second end 216 of the flexible barrier 204 is continuously connected.

Figure 4:
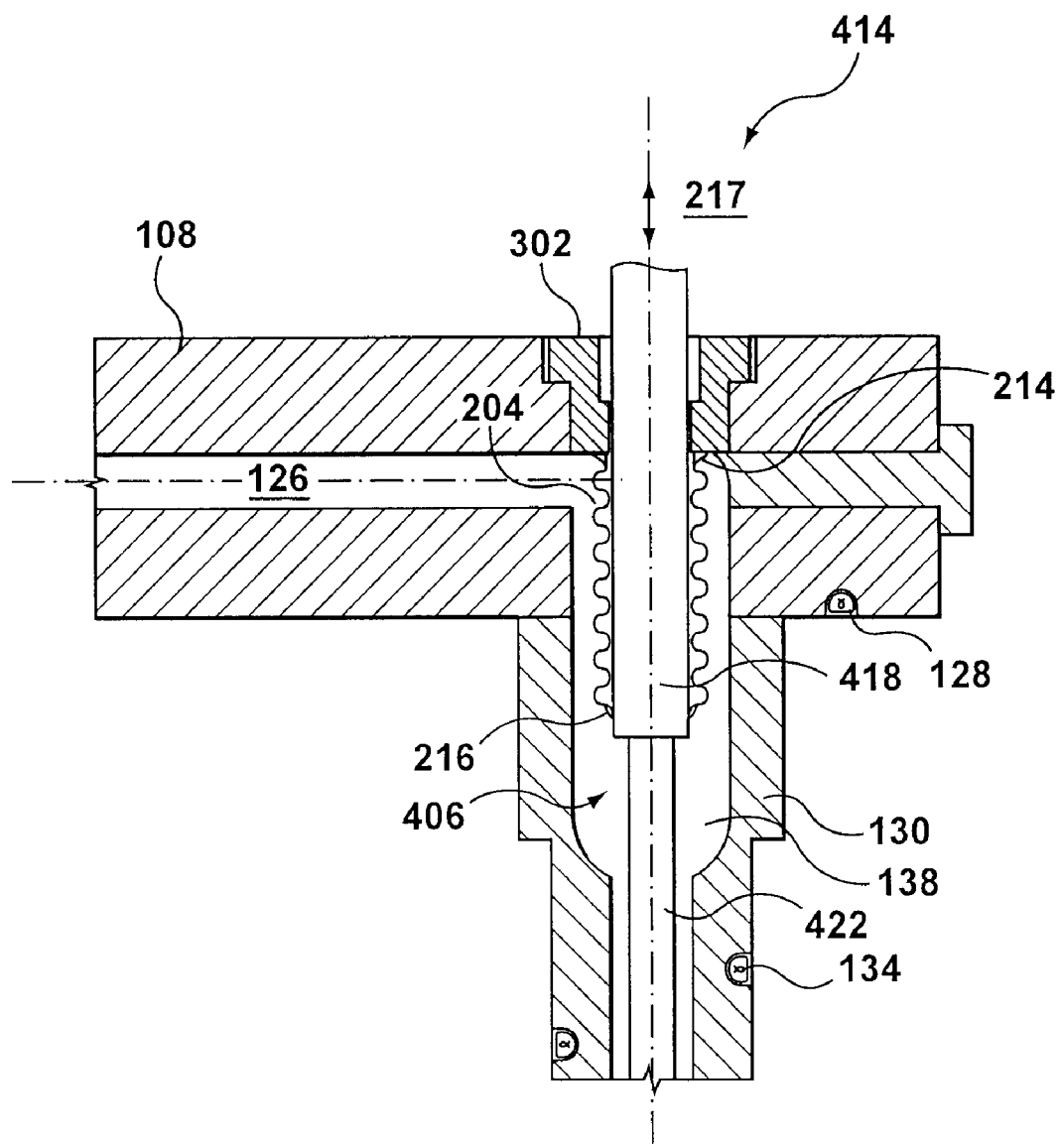
FIG. 4 is a cross-sectional view of a valve pin bushing assembly having a valve pin with a wider upper portion according to another embodiment of the present invention.

FIG. 4 is a cross-sectional view showing a valve pin bushing assembly 414 having a valve pin with a wider upper portion according to another embodiment of the present invention. In the description of this embodiment, like reference numerals are used to describe like parts for ease of understanding. Only differing features and aspects of the present embodiment are described in detail in order to avoid repetition. For description of the like parts, methods of manufacturing, methods of operation, and advantages, the other embodiments can be referenced. In addition, the features and aspects described for the other embodiments can be used accordingly with the present embodiment.

The valve pin bushing assembly 414 comprises a bushing body 302, a flexible barrier 204, and a valve pin 406.

The bushing body 302 is installed in a recess of the manifold 108 and can be secured to the manifold 108 by a thread or other means. The bushing body 302 is as previously described with respect to FIG. 3.

The flexible barrier 204 extends from the bushing body 302 into the manifold channel 126 and/or the nozzle channel 138. In this embodiment, the flexible barrier 204 is a bellows much the same as previously described with respect to FIG. 2, other than that the clear inner diameter of the flexible barrier 204 is matched to the outer diameter of the valve pin 406 and collapse of the flexible barrier 204 due to pressure of the molding material is prevented by the valve pin 406. In addition, as can be seen, valve pin travel is not limited by a support tube; instead the maximum travel is limited by the permissible extension and compression of the flexible barrier 204.

The first end 214 of the flexible barrier 204 is continuously connected to the bushing body 302, and the second end 216 of the flexible barrier 204 is continuously connected to the valve pin 406. Such continuous connections have been described above with reference to FIG. 2.

The valve pin 406 extends in an upstream direction towards an actuator (e.g., actuator 112) and in a downstream direction towards a mold gate (e.g., mold gate 142). The valve pin 406 includes an upper portion 418 and a lower portion 422. The upper portion 418 has a diameter larger than the lower portion 422 and is connected to the actuator. The upper portion 418 extends downstream through the flexible barrier 204 and is continuously connected to the second end 216 of the flexible barrier 204. The lower portion 422 extends downstream to the mold gate and can be of any design, such as cylindrical, tapered, or stepped. The valve pin 206 can be made from one piece or can be made from several pieces joined together. These pieces may be made of the same or different materials.

Figure 5:
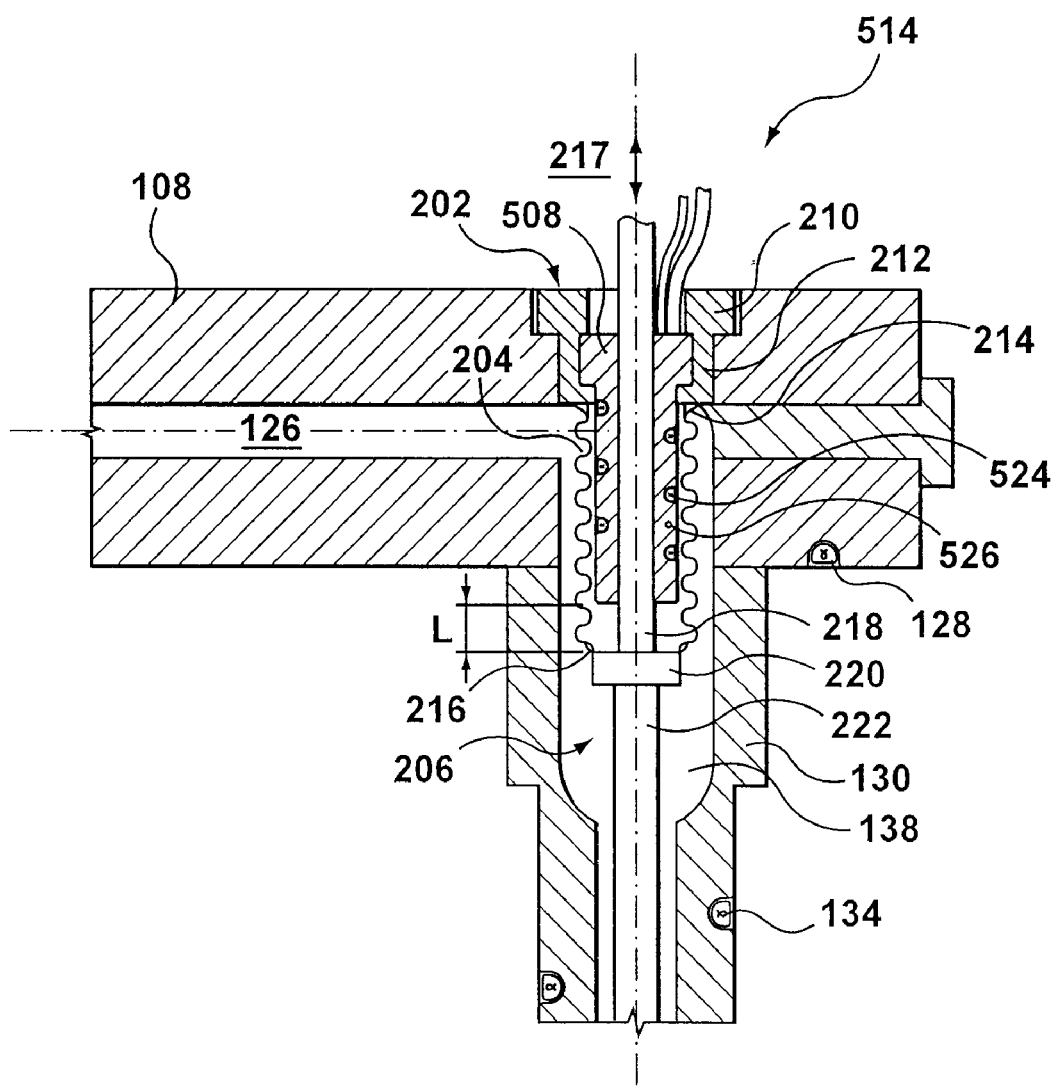
FIG. 5 is a cross-sectional view of a valve pin bushing assembly having a heater according to another embodiment of the present invention.

FIG. 5 is a cross-sectional view showing a valve pin bushing assembly 514 having a heater according to another embodiment of the present invention. In the description of this embodiment, like reference numerals are used to describe like parts for ease of understanding. Only differing features and aspects of the present embodiment are described in detail in order to avoid repetition. For description of the like parts, methods of manufacturing, methods of operation, and advantages, the other embodiments can be referenced. In addition, the features and aspects described for the other embodiments can be used accordingly with the present embodiment.

In this embodiment, a support tube 508 is provided with a heater 524, such as an electrical resistance heater wire. The heater 524 follows a helical path inside the support tube 508 and can be embedded in a groove or cast in. An optional thermocouple 526 is also provided in the support tube 508 to measure the temperature of the surrounding material.

Figure 6:
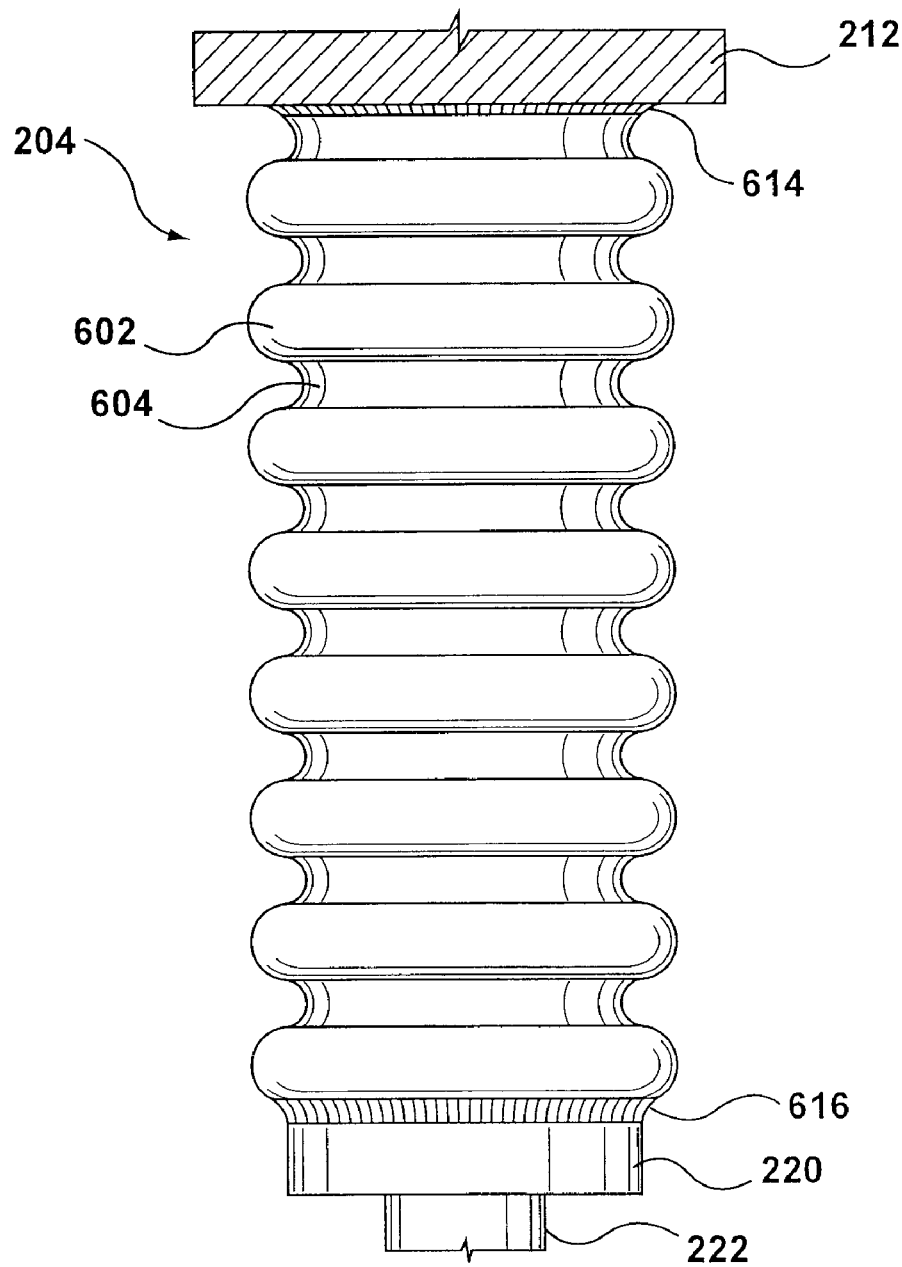

FIG. 6 shows a schematic diagram of the flexible barrier 204. Weld 614 holds the flexible barrier 204 to the lower portion 212 of the bushing body 202. Weld 616 holds the flexible barrier 204 to the middle portion 220 of the valve pin 206. Welds 614, 616 are continuous connections that are leak-proof. The peak of one of the convolutions is shown at 602 and a neighboring valley is shown at 604. It should be noted that the number of convolutions is exemplary, and more or fewer may be provided. Similar or identical arrangements apply to the other embodiments described herein.

Figure 7:
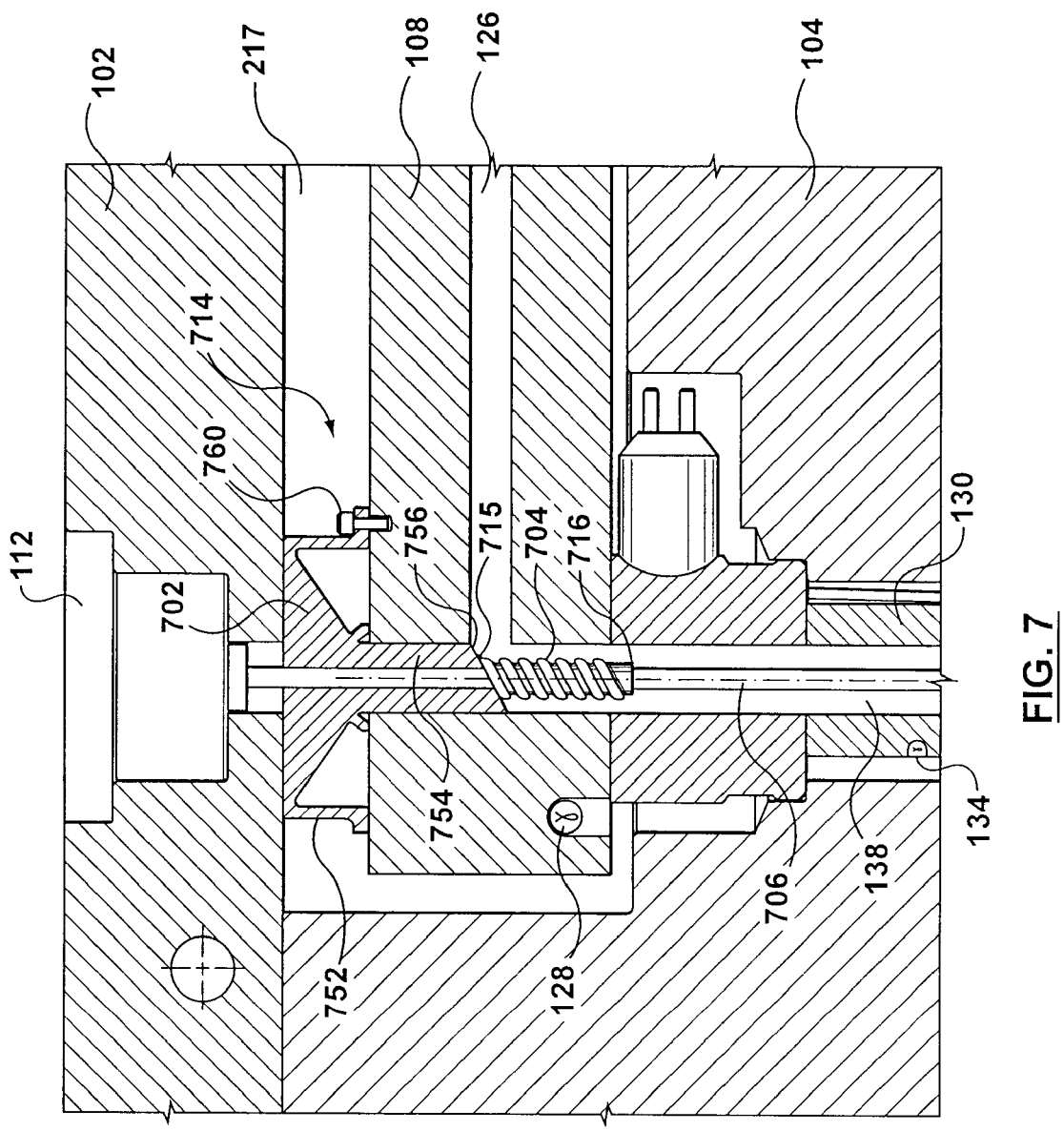
FIG. 7 is a partial cross-sectional view of a valve pin bushing assembly having a helically shaped flexible barrier according to another embodiment of the present invention.

FIG. 7 is a partial cross-sectional view showing a valve pin bushing assembly 714 having a helically shaped flexible barrier according to another embodiment of the present invention. In the description of this embodiment, like reference numerals are used to describe like parts for ease of understanding. Only differing features and aspects of the present embodiment are described in detail in order to avoid repetition. For description of the like parts, methods of manufacturing, methods of operation, and advantages, the other embodiments can be referenced. In addition, the features and aspects described for the other embodiments can be used accordingly with the present embodiment.

The valve pin bushing assembly 714 includes a bushing body 702, a valve pin 706, and a helically shaped flexible barrier 704 (not sectioned).

The bushing body 702 is installed in a recess of the manifold 108 and can be secured to the manifold 108 by force from the back plate 102 or by other means. The bushing body 702 includes support flange 752 and a tubular portion 754 that extends downstream into the manifold 108. The downstream-facing surface of the tubular portion 754 is a flow guiding surface 756 that helps define the manifold channel 126. The flow guiding surface 756 can be beveled (as shown) or curved to guide the flowing molding material around the corner. An alignment pin 760 can be used to locate the bushing body in the manifold 108. The bushing body 702 can be a single piece, as depicted, or made from multiple pieces.

The flexible barrier 704 extends from the bushing body 702 into the manifold channel 126 and/or the nozzle channel 138. In this embodiment, the flexible barrier 704 has a helical shape, that is, the flexible barrier 704 is generally cylindrical in shape, is thin walled, and has a helical convolution, which allows for longitudinal extension and contraction without permanent deformation. In another embodiment, more than one helical convolution can be provided. The flexible barrier 704 has a first end 715 that is continuously connected to the flow guiding surface 756 of the bushing body 702 and also has a second end 716 that is continuously connected to the valve pin 706.

The valve pin 706 extends in an upstream direction towards the actuator 112 and in a downstream direction towards a mold gate (e.g., mold gate 142).

Manufacturing the helical flexible barrier 704 can be achieved by techniques such as electroforming and hydroforming, among others. Any material could be used for the flexible barrier 704 as long as such material offers sufficient elastic expansion/contraction, sufficient resistance to collapse due to pressure of the molding material, and sufficient chemical compatibility with the molding material. Stainless steel is an example of such material.

Figures 8, 9:
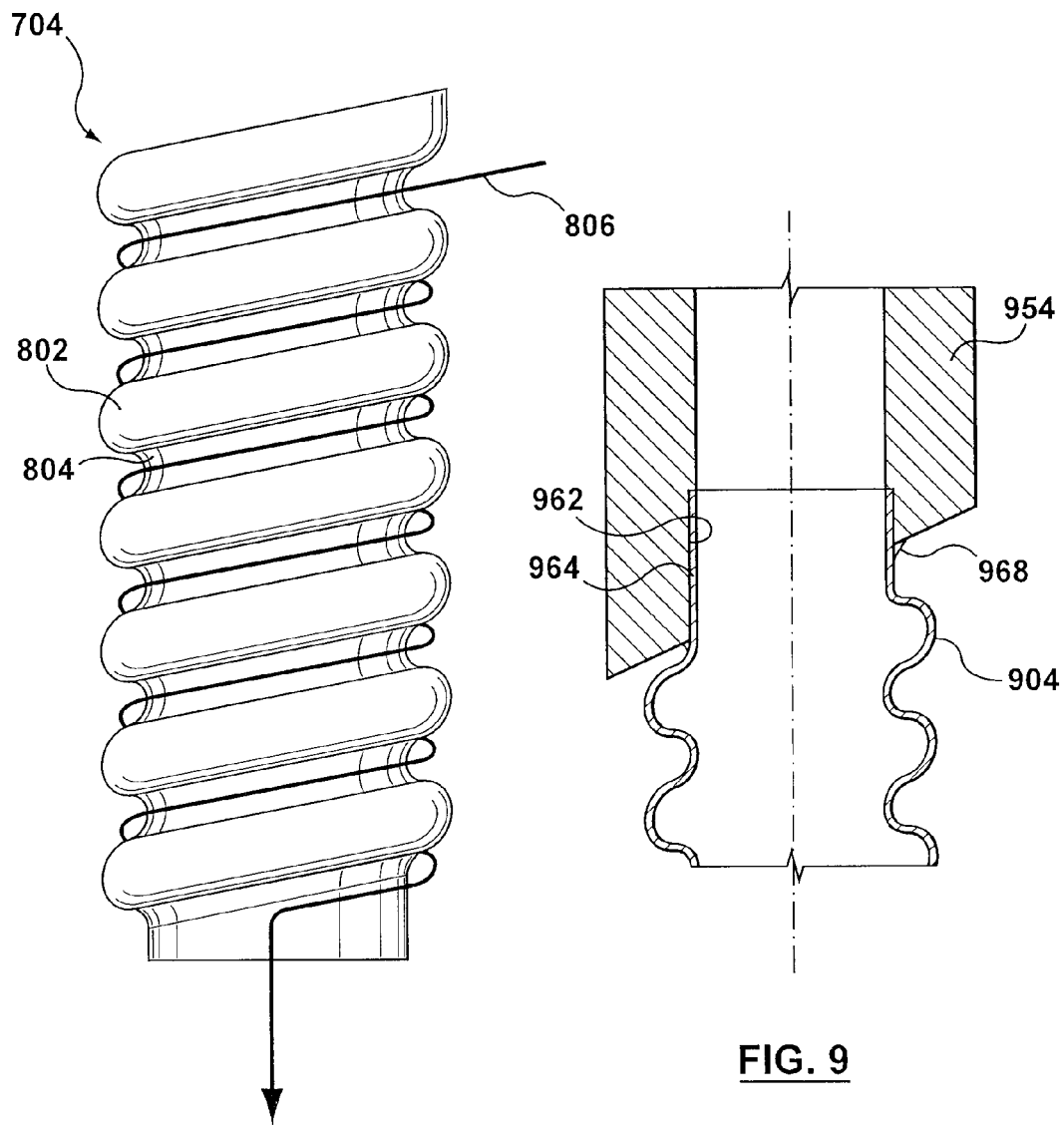
FIG. 8 is a schematic diagram of the flexible barrier of FIG. 7 showing a flow path of molding material.
FIG. 9 is a cross-sectional view of a connection between a bushing body and a flexible barrier according to another embodiment of the present invention.

FIG. 8 shows a schematic diagram of the flexible barrier 704. The peak of the helical convolution is shown at 802 and the valley of the helical convolution is shown at 804. The helical shape of the flexible barrier 704 is highlighted by a flow path 806 of molding material. This helical flow path 806 is one reason why the flexible barrier 704 can reduce stagnation of molding material. It should be understood that the flow path 806 is just one flow path and other flow paths will exist as well. In addition, the flow path 806 may not be possible for certain molding materials. It should be noted that the number of loops of the helical convolution is exemplary, and more or fewer may be used.

FIG. 9 shows a cross-sectional view of a connection between a bushing body and a flexible barrier 904 according to another embodiment of the present invention. A tubular portion 954 of the bushing body has a counter bore 962. A tubular neck portion 964 of the flexible barrier 904 is fitted into the counter-bore 962, and a weld 968 is applied at the external joint. This connection could also be fastened by other means, such as brazing, soldering, shrink fitting, interference fitting, etc.

Figure 10:
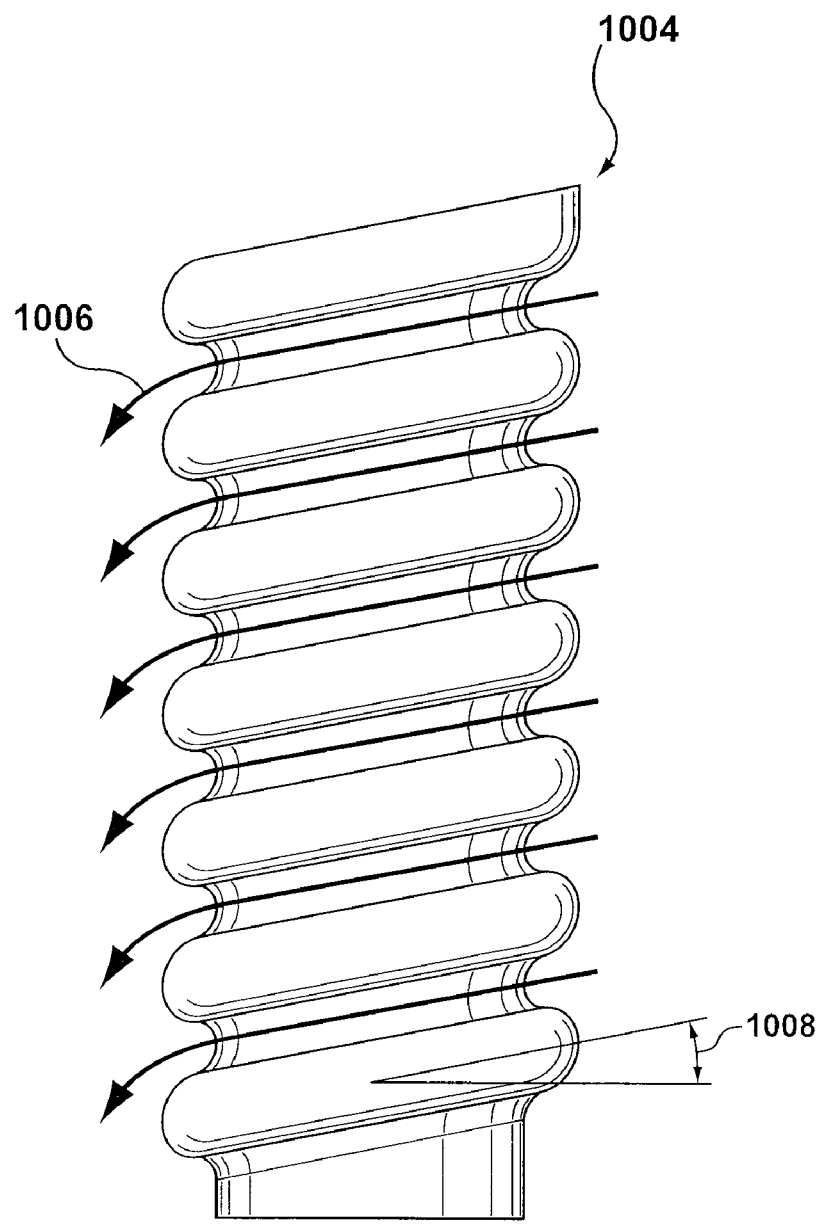
FIG. 10 is a schematic diagram of the flexible barrier having angled circumferential convolutions according to another embodiment of the present invention.

FIG. 10 shows a schematic diagram of a flexible barrier 1004 having angled circumferential convolutions according to another embodiment of the present invention. The flexible barrier 1004 is much like the flexible barrier 204 shown in FIG. 6, except that the convolutions are tilted at an angle 1008. Flow paths 1006 show how the tilted convolutions can reduce stagnation of molding material. It should be noted that the number of convolutions is exemplary, and more or fewer may be used. The flexible barrier 1004 can be used with any of the valve pin bushings described herein.

Figure 11:
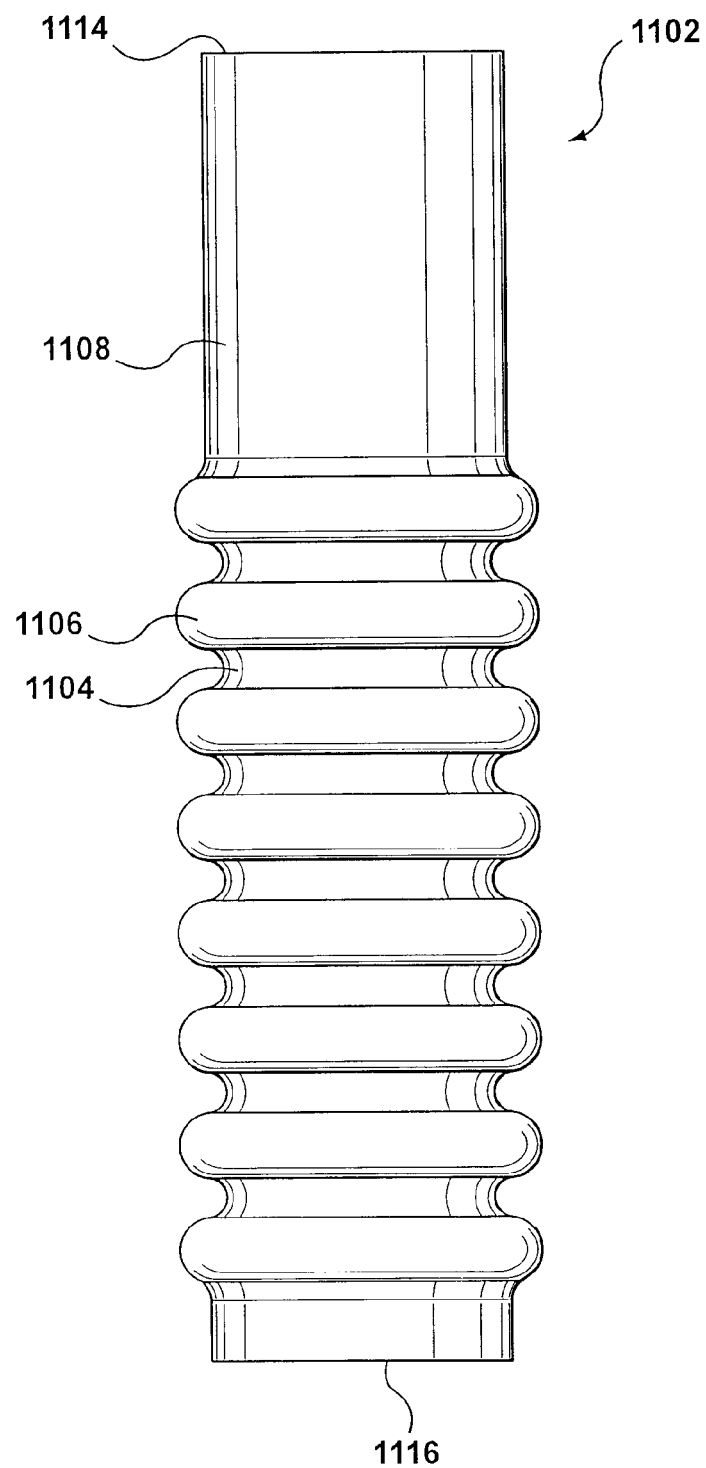
FIG. 11 is a schematic diagram of a flexible barrier having an elongated tubular neck according to another embodiment of the present invention.

FIG. 11 shows a schematic diagram of a flexible barrier 1104 having an elongated tubular neck 1108 according to another embodiment of the present invention. The neck 1108 extends upstream to a bushing body (e.g., bushing body 302) and joins such at a first end 1114 with a continuous connection. A second end 1116 is joined to a valve pin (e.g., valve pin 306) also with a continuous connection. The length of the elongated tubular neck 1108 places the convolutions further downstream, which can reduce stagnation of molding material, which is beneficial to applications such as color change. However, the material of the flexible barrier at the neck 1108 may need to be thicker than at the convolutions to properly resist molding pressure. Also illustrated are the peak of one of the convolutions at 1106 and a neighboring valley at 1104. It should be noted that the number of convolutions is exemplary, and more or fewer may be used. The flexible barrier 1104 can be used with any of the valve pin bushings described herein.

Figure 12:
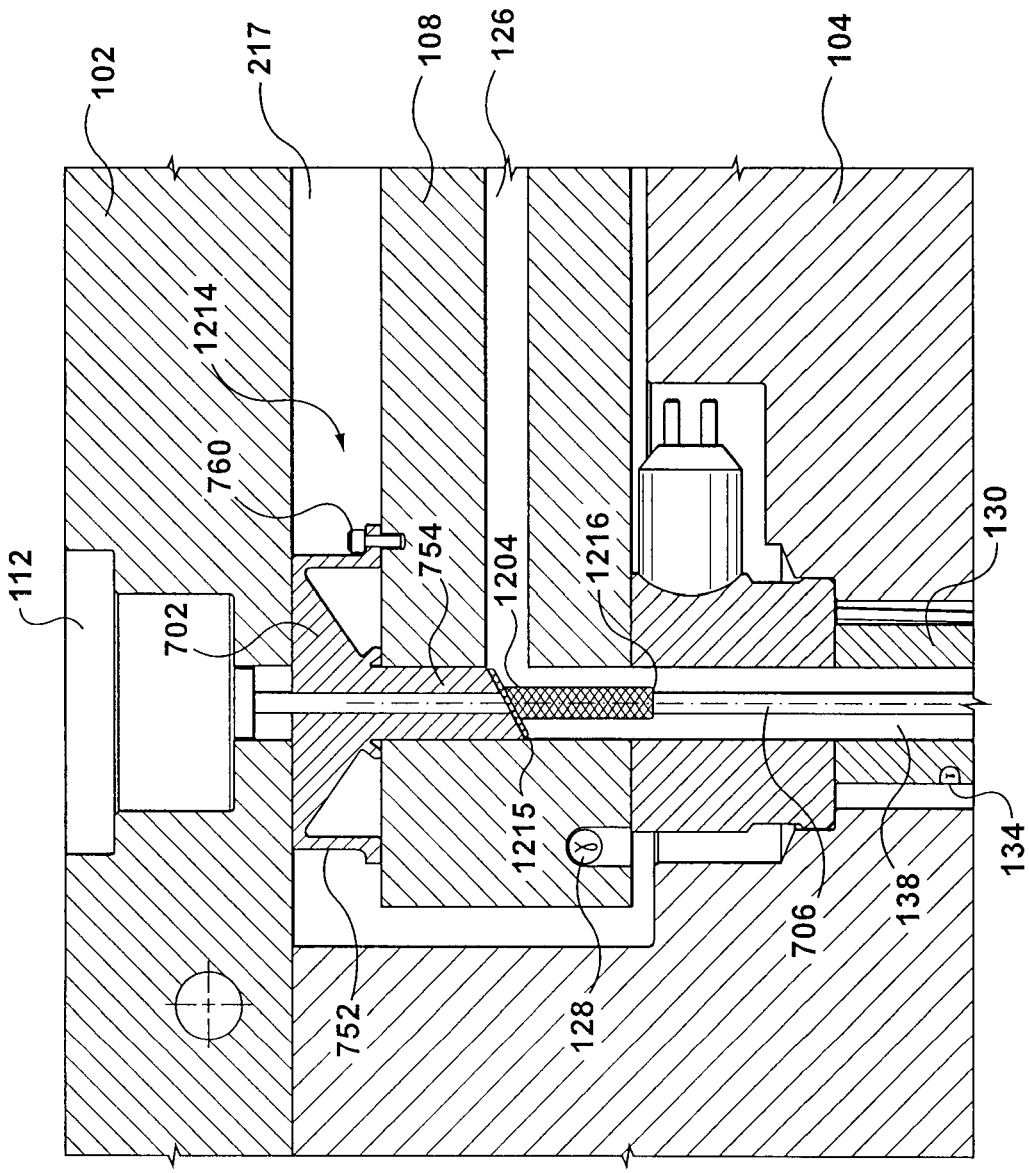
FIG. 12 is a partial cross-sectional view of a valve pin bushing assembly having a fabric flexible barrier according to another embodiment of the present invention.

FIG. 12 is a partial cross-sectional view showing a valve pin bushing assembly 1214 having a fabric flexible barrier according to another embodiment of the present invention. In the description of this embodiment, like reference numerals are used to describe like parts for ease of understanding. Only differing features and aspects of the present embodiment are described in detail in order to avoid repetition. For description of the like parts, methods of manufacturing, methods of operation, and advantages, the other embodiments can be referenced. In addition, the features and aspects described for the other embodiments can be used accordingly with the present embodiment.

The valve pin bushing assembly 1214 includes a bushing body 702, a valve pin 706, and a flexible barrier 1204 (not shown in section) made of fabric.

The flexible barrier 1204 extends from the bushing body 702 into the manifold channel 126 and/or the nozzle channel 138. In this embodiment, the flexible barrier 1204 is made of a mainly cylindrical piece of fabric, which can bunch up or fold over itself as the valve pin 706 moves upstream. The fabric may also be capable of stretching to some extent. The flexible barrier 1204 has a first end 1215 that is continuously connected to the downstream-facing surface of the tubular portion 754 of the bushing body 702 and also has a second end 1216 that is continuously connected to the valve pin 706. Such continuous connections can be achieved by an adhesive, for example. Other acceptable connection methods include mechanical connections, such as shrink fitting and interference fitting using a ring. A main requirement for the continuous connections of the first end 1215 to the tubular portion 754 of the bushing body 702 and the second end 1216 to the valve pin 206 is that they be leak proof. A sealing material can be used in conjunction with the fabric material of the flexible barrier 1204 to enhance the leak proof quality of the fabric barrier. Such sealing material can be a flexible polymer film that is sprayed or otherwise applied to the fabric, on the outside, the inside, or on both sides. The fabric material of the flexible barrier 1204 can be a woven ceramic such as NEXTEL that is commercially available from 3M.

The valve pin 706 extends in an upstream direction towards the actuator 112 and in a downstream direction towards a mold gate (e.g., mold gate 142).

Figure 13B:
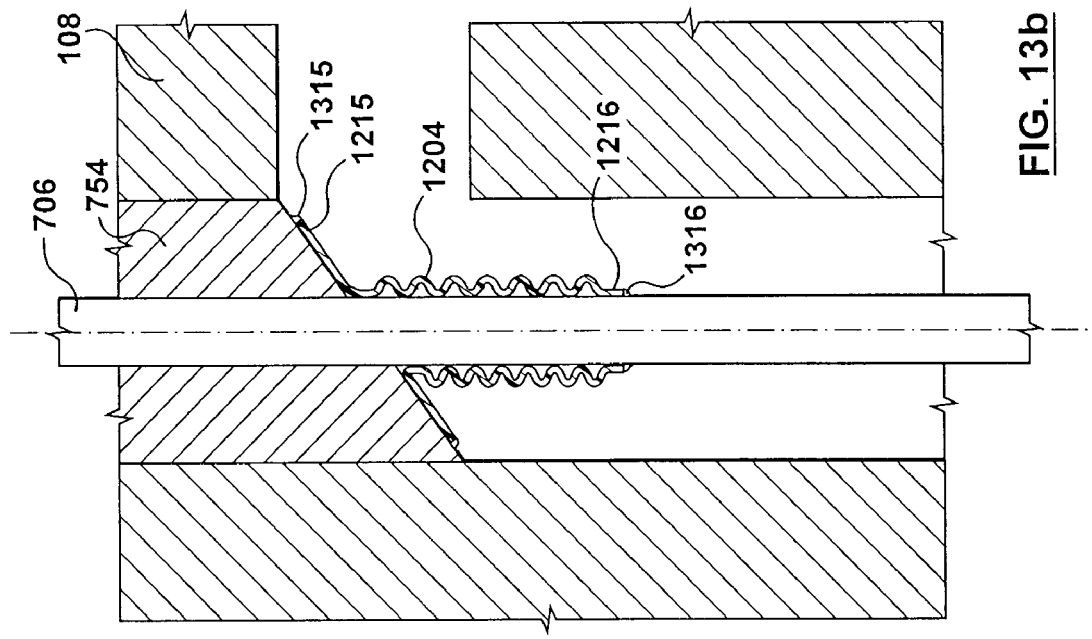
FIGS. 13a-b are cross-sectional views of the fabric flexible barrier of FIG. 12 in various positions.
Figure 13A:
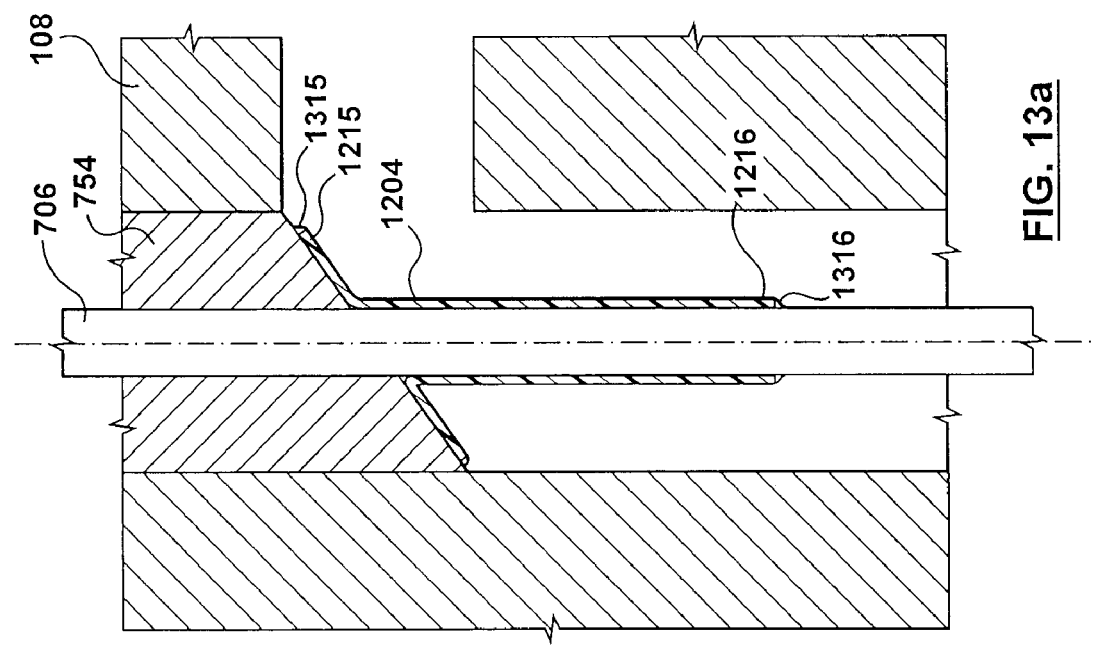

Operation of the valve pin bushing assembly is best described with reference to FIGS. 13a-b. The valve pin 706 as shown in FIG. 13a is fully extended downstream. Accordingly, the fabric flexible barrier 1204 is fully extended. When the valve 706 pin is retracted to the upstream position, the fabric flexible barrier 1204 bunches up or folds over itself, as shown in FIG. 13b. Also shown in FIGS. 13a-b are adhesive beads 1315, 1316 bonding the first and second ends 1215, 1216, respectively. During operation, if no additional sealing material is provided to the fabric, molding material may saturate the spaces between the threads or fibers that make up the fabric. Such saturation of molding material may improve sealing.

Figure 14:
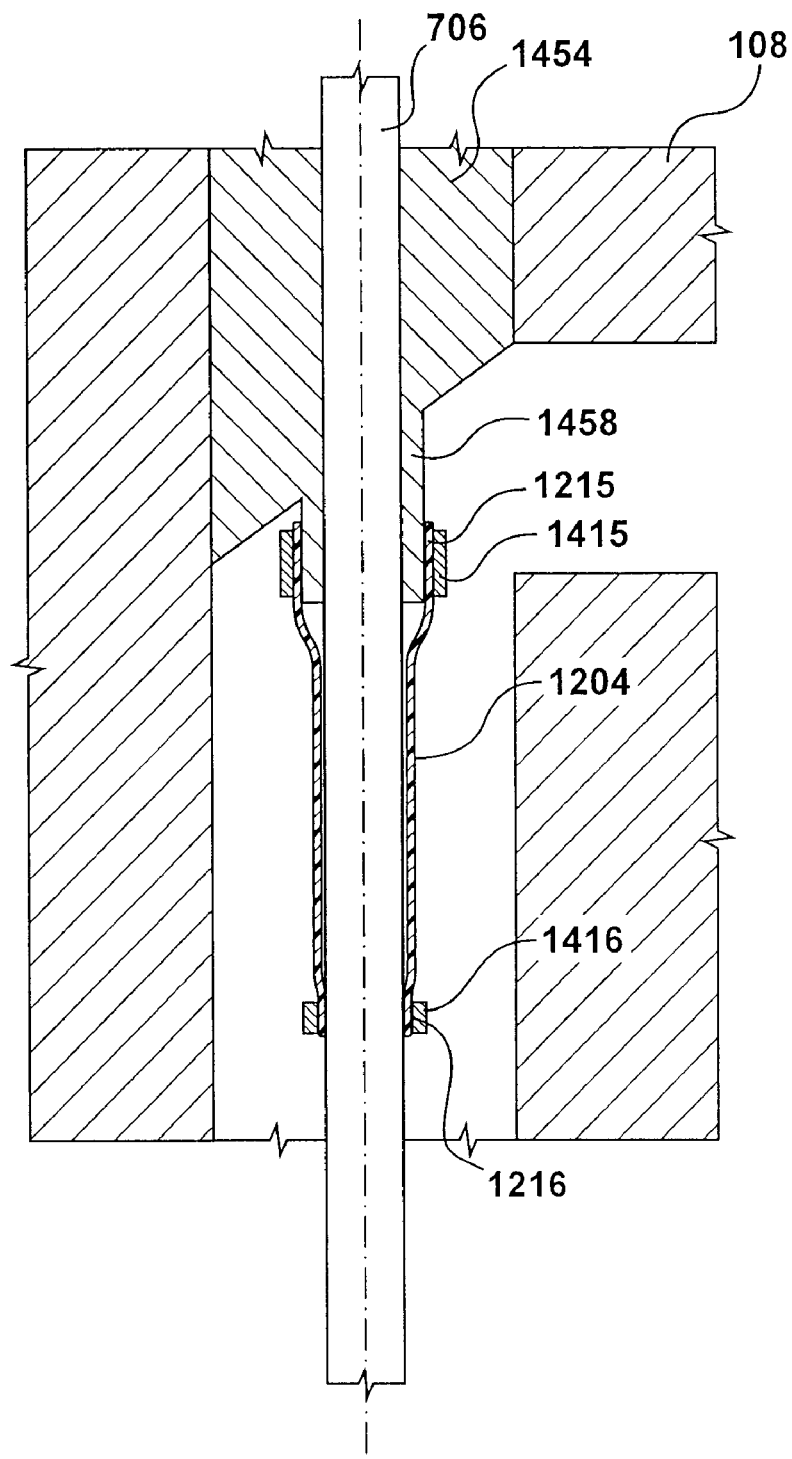
FIG. 14 is a partial cross-sectional view of another way of continuously connecting a fabric flexible barrier according to another embodiment of the present invention.

FIG. 14 is a partial cross-sectional view showing another way of continuously connecting a fabric flexible barrier according to another embodiment of the present invention. In the description of this embodiment, like reference numerals are used to describe like parts for ease of understanding. Only differing features and aspects of the present embodiment are described in detail in order to avoid repetition. For description of the like parts, methods of manufacturing, methods of operation, and advantages, the other embodiments can be referenced. In addition, the features and aspects described for the other embodiments can be used accordingly with the present embodiment.

A tubular portion 1454 of a bushing body (e.g., bushing body 702) has a narrow neck portion 1458 extending downstream into the molding material channel as far as desirable. The first end 1215 of the fabric flexible barrier 1204 is held in a continuous connection to the neck portion 1458 by a ring 1415. Similarly, the second end 1216 of the fabric flexible barrier 1204 is held in a continuous connection to the valve pin 706 by a ring 1416. The rings 1415, 1416 can be installed by shrink fitting or interference fitting, for example.

In another embodiment similar to the embodiments using fabric flexible barriers described above, the flexible barrier is a flexible polymer membrane. This embodiment is essentially the same as those with fabric flexible barriers, except that a flexible polymer membrane, such as a silicone membrane, is used in place of a fabric.

Figure 15:
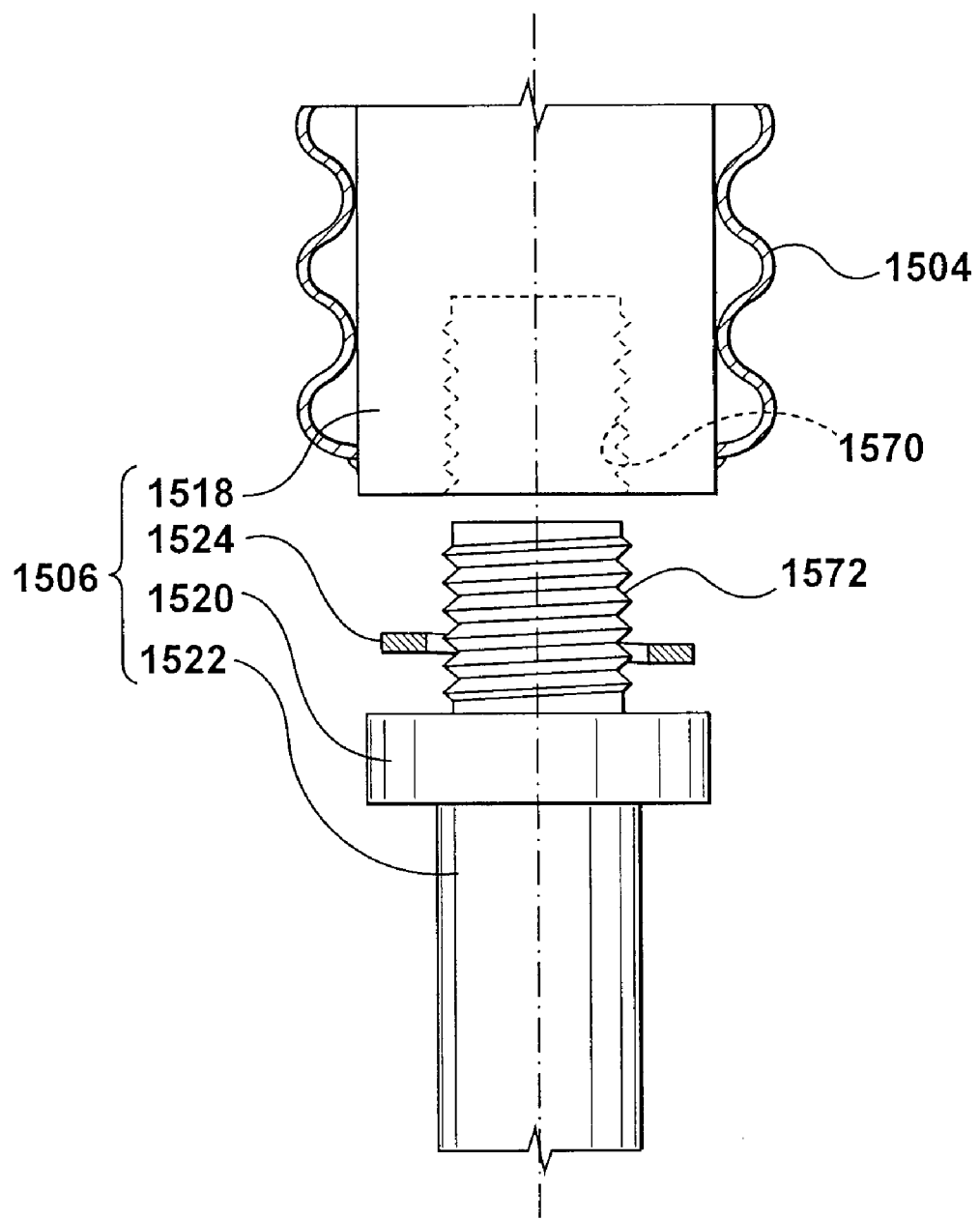
FIG. 15 is a side view of a separable valve pin for use with a valve pin bushing assembly according to an embodiment of the present invention.

FIG. 15 shows a separable valve pin 1506 that can be used with any of the valve pin bushing assemblies discussed herein. The separable valve pin 1506 includes an upper portion 1518, a middle portion 1520, a lower portion 1522, and a lock washer 1524. A flexible barrier 1504 is continuously connected to the upper portion 1518 of the valve pin 1506 and to a bushing body (not shown).

The upper portion 1518 of the valve pin 1506 has a threaded bore 1570 for connecting to a threaded end 1572 of the middle portion 1520, which is fixed to the lower portion 1522 and may be an integral head of the lower portion 1522. The lock washer 1524 is situated between the upper portion 1518 and the middle portion 1520 to maintain the threaded connection (e.g., against vibration). When screwing the threaded end 1572 into the treaded bore 1570, unacceptable torque should be avoided, particularly on the flexible barrier 1504. To this end, the upper portion 1518 can be held against rotation. This can be achieved, for example, by a region of non-circular cross-section provided to the upper portion 1518 and a mating region provided to a fixed component such as the bushing body, the manifold, or the actuator. In addition, the threaded connection could be reversed, with the upper portion 1518 having a threaded end and the middle portion 1520 having a threaded bore.

To facilitate assembly and disassembly, any of the upper portion 1518, the middle portion 1520, and the lower portion 1522 can be provided with flats for tools. Assembly and disassembly can be performed when the surrounding apparatus (i.e., hot half 100) is assembled, with the lower portion 1522 being inserted or removed via the front end of a nozzle.

The separable valve pin 1506 allows replacement of the portion of the lower portion 1522, which is typically most susceptible to wear and damage, without having to remove and replace the entire valve pin bushing assembly.

Figure 16:
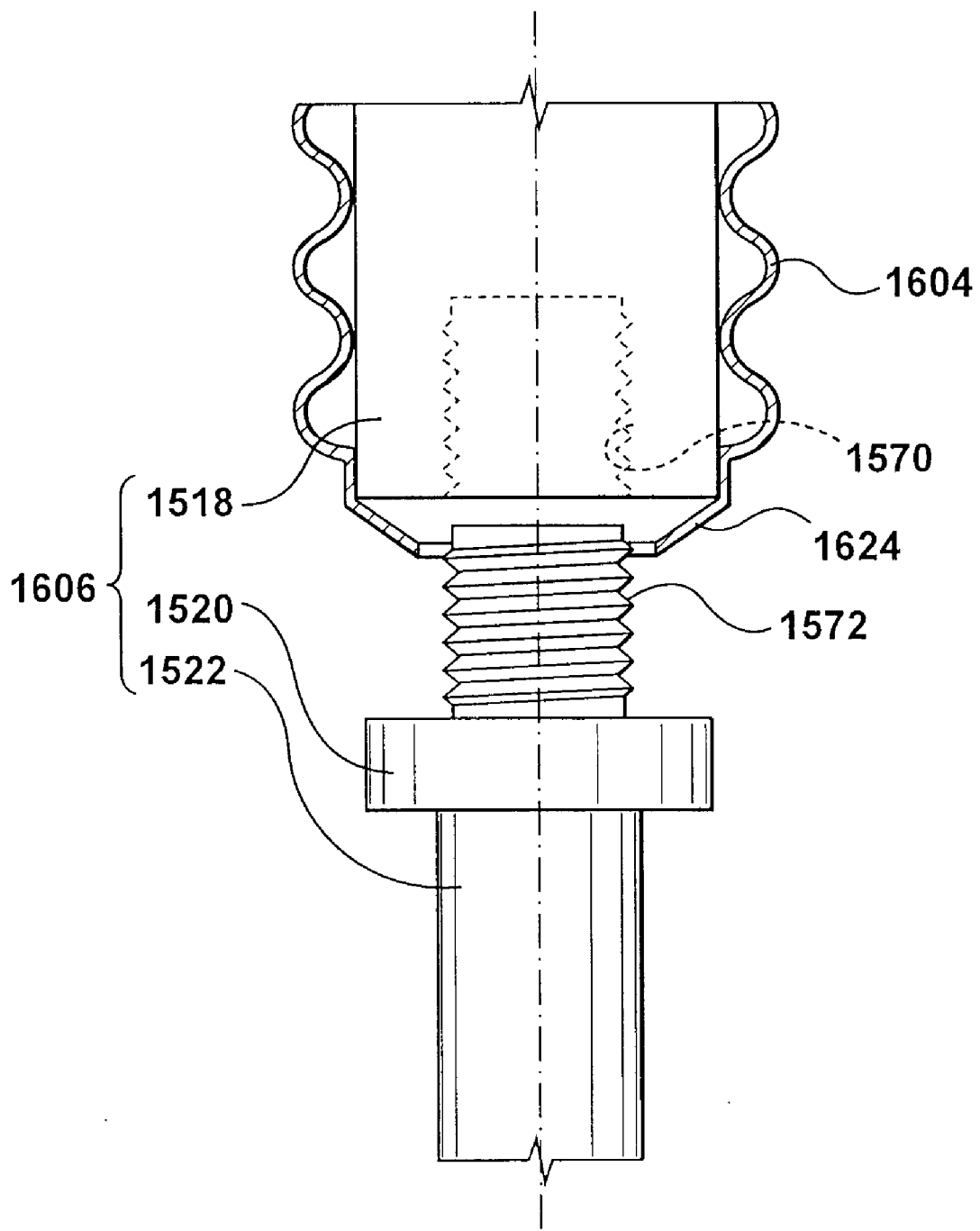
FIG. 16 is a side view of another separable valve pin for use with a valve pin bushing assembly according to an embodiment of the present invention.

FIG. 16 shows another type of separable valve pin 1606 that can be used with any of the valve pin bushing assemblies discussed herein. The separable valve pin 1606 includes an upper portion 1518, a middle portion 1520, and a lower portion 1522. A flexible barrier 1604 is continuously connected to a bushing body (not shown).

The upper portion 1518 of the valve pin 1606 has a threaded bore 1570 for connecting to a threaded end 1572 of the middle portion 1520, which is fixed to the lower portion 1522 and may be an integral head of the lower portion 1522. The flexible barrier 1604 has an end 1624 that is shaped to act as a lock washer and is situated between the upper portion 1518 and the middle portion 1520 to maintain the threaded connection (e.g., against vibration) and provide a continuous connection against leakage. When screwing the threaded end 1572 into the treaded bore 1570, unacceptable torque should be avoided, particularly on the flexible barrier 1604. To this end, the upper portion 1518 can be held against rotation. This can be achieved, for example, by a region of non-circular cross-section provided to the upper portion 1518 and a mating region provided to a fixed component such as the bushing body, the manifold, or the actuator. In addition, the threaded connection could be reversed, with the upper portion 1518 having a threaded end and the middle portion 1520 having a threaded bore.

To facilitate assembly and disassembly, any of the upper portion 1518, the middle portion 1520, and the lower portion 1522 can be provided with flats for tools. Assembly and disassembly can be performed when the surrounding apparatus (i.e., hot half 100) is assembled, with the lower portion 1522 being inserted or removed via the front end of a nozzle.

Figure 17:
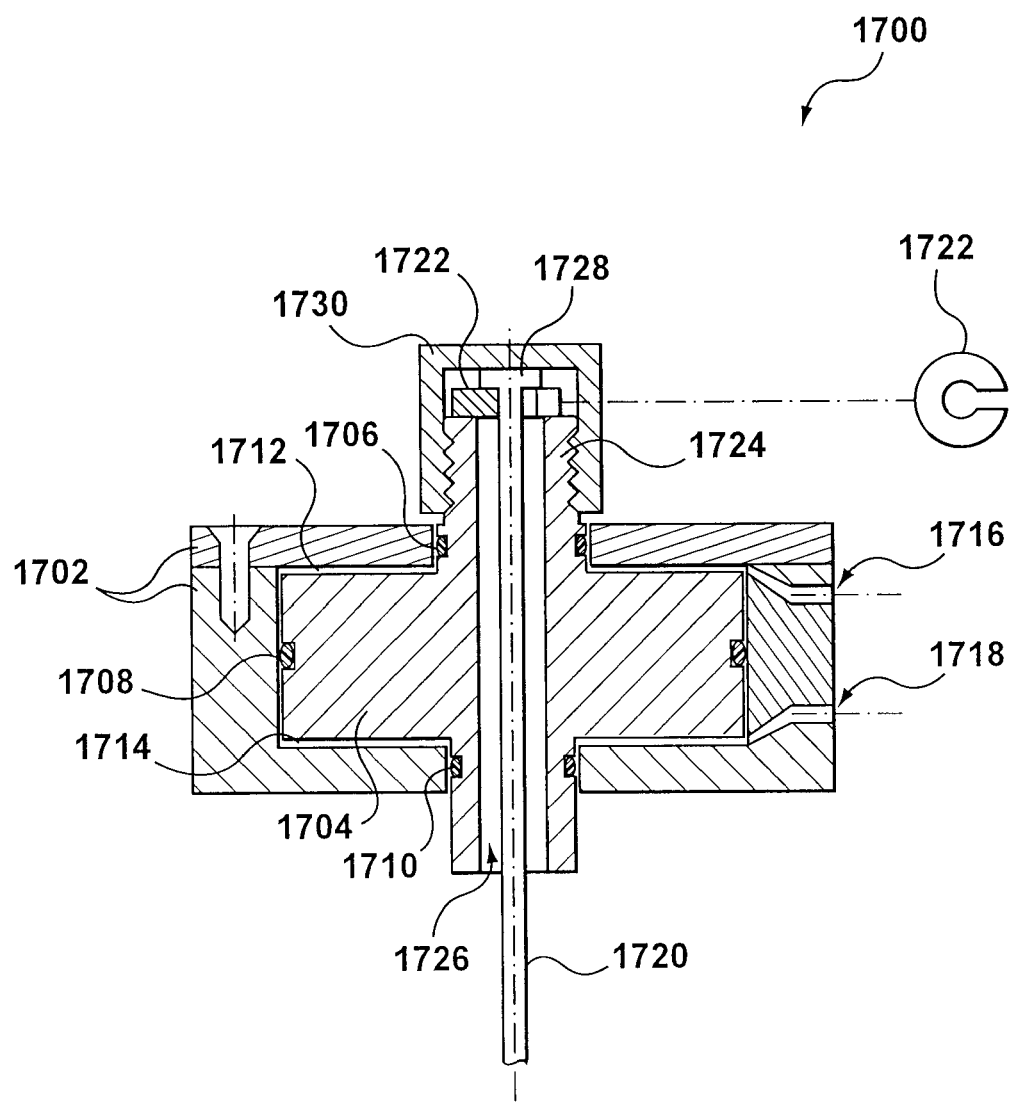
FIG. 17 is a cross-sectional view of an actuator for use with a valve pin bushing assembly according to an embodiment of the present invention.

FIG. 17 shows an actuator 1700 for use with any of the valve pin bushing assemblies discussed herein.

The actuator 1700 comprises a housing 1702 and a piston 1704 that can slide within the housing 1702. The piston 1704 is slidably sealed to the housing 1702 by way of seals 1706, 1708, 1710 (e.g., O-rings). Between the piston 1704 and housing 1702 are gaps 1712, 1714 in which pressurized fluid (e.g., air or hydraulic fluid) can be provided to move the piston 1704 relative to the housing 1702, such fluid being provided at ports 1716, 1718.

A valve pin 1720, such as any of the valve pins discussed herein, is attached to the piston 1704 by way of a clip 1722 seated on a threaded neck 1724 to support the valve pin 1720 in a bore 1726 of the piston 1704. The clip 1722 can be U-shaped or C-shaped, for example, and seats the head 1728 of the valve pin 1720 on the neck 1724 of the piston 1704. A threaded cap 1730 is provided to thread onto the neck 1724 to hold the head 1728 of the valve pin 1720 against the clip 1722. By way of the cap 1730 and the clip 1722 the valve pin 1720 is removably connected to the piston 1704.

The bore 1726 of the piston 1704 is made larger than the largest diameter of the valve pin 1720, which, in this case, is the head 1728. This allows the valve pin 1720 to be easily separated from or connected to the actuator 1700. For example, when the valve pin 1720 is to be detached, the threaded cap 1730 is first removed, the clip 1722 is then slid off, and then the housing 1702 and piston 1704 can be lifted away from the valve pin 1720 as a single piece. This means that the actuator 1700 and/or the entire back plate (e.g., back plate 102) in which it is located can be removed without disturbing the valve pin 1720. This is useful for overall assembly and disassembly when the valve pin 1720 forms part of a valve pin bushing assembly, such as those described herein. That is, the back plate can be removed leaving the valve pins in place, and then the valve pin bushing assemblies, including the valve pins, can then be removed from the manifold (e.g., manifold 108) as desired.

Although many embodiments of the present invention have been described, those of skill in the art will appreciate that other variations and modifications may be made without departing from the spirit and scope thereof as defined by the appended claims. All patents and publications discussed herein are incorporated in their entirety by reference thereto.

The invention claimed is:

1. A valve pin bushing assembly for an injection molding apparatus, comprising:
    a bushing body for connection to a manifold;
    a flexible barrier having a first end that is continuously connected to the bushing body; and
    a valve pin continuously connected to a second end of the flexible barrier, the valve pin for extending through a nozzle in a downstream direction towards a mold gate, wherein the valve pin is movable in an upstream direction and in the downstream direction for opening and closing the mold gate;
    wherein the flexible barrier seals a channel of molding material from an outside space.

2. The valve pin bushing assembly of claim 1, wherein the flexible barrier is generally cylindrical in shape and has at least one convolution.

3. The valve pin bushing assembly of claim 2 further comprising a support tube disposed within the flexible barrier, the support tube supporting the flexible barrier against collapse due to pressure of molding material.

4. The valve pin bushing assembly of claim 3, wherein the support tube is part of the bushing body.

5. The valve pin bushing assembly of claim 3, wherein the support tube has a heater.

6. The valve pin bushing assembly of claim 1, wherein the flexible barrier is a bellows.

7. The valve pin bushing assembly of claim 1, wherein the flexible barrier has a tubular neck portion extending between the bushing body and a first downstream convolution of the flexible barrier.

8. The valve pin bushing assembly of claim 1, wherein the flexible barrier is made of metal.

9. The valve pin bushing assembly of claim 1, wherein the valve pin extends in an upstream direction towards an actuator.

10. The valve pin bushing assembly of claim 9, wherein the flexible barrier is generally cylindrical in shape and the upstream portion of the valve pin has an upstream portion disposed within the flexible barrier and supporting the flexible barrier against collapse due to pressure of molding material.

11. The valve pin bushing assembly of claim 1, wherein the valve pin has an upper portion, a middle portion, and a lower portion, the middle and lower portions are joined, the middle portion is continuously connected to the flexible barrier, the upper portion is not joined to the middle portion or the lower portion, the flexible barrier is generally cylindrical in shape and the upper portion is disposed within the flexible barrier, and the upper portion is capable of pushing the middle portion to move the middle and lower portions downstream.

12. The valve pin bushing assembly of claim 11, wherein the upper portion supports the flexible barrier against collapse due to pressure of molding material.

13. The valve pin bushing assembly of claim 1, wherein the valve pin comprises two portions separably connected together.

14. The valve pin bushing assembly of claim 1, wherein the bushing body has a narrow neck portion extending downstream and the first end of the flexible barrier is continuously connected to the narrow neck portion.

15. The valve pin bushing assembly of claim 1, wherein the first end of the flexible barrier is metallurgically connected to the bushing body.

16. The valve pin bushing assembly of claim 15, wherein the metallurgical connection is selected from the group consisting of a brazed connection, a welded connection, and a soldered connection.

17. The valve pin bushing assembly of claim 1, wherein the second end of the flexible barrier is metallurgically connected to the valve pin.

18. The valve pin bushing assembly of claim 17, wherein the metallurgical connection is selected from the group consisting of a brazed connection, a welded connection, and a soldered connection.

19. The valve pin bushing assembly of claim 1, wherein the first end of the flexible barrier is mechanically connected to the bushing body.

20. The valve pin bushing assembly of claim 1, wherein the second end of the flexible barrier is mechanically connected to the valve pin.

21. An injection molding apparatus, comprising:
a back plate;
an actuator connected to the back plate;
a mold plate;
a manifold disposed between the back plate and the mold plate, the manifold having a manifold channel;
a nozzle connected to the manifold and disposed in a well of the mold plate, the nozzle having a nozzle channel in communication with the manifold channel; and
a valve pin bushing assembly, comprising:
a bushing body connected to the manifold;
a flexible barrier having a first end that is continuously connected to the bushing body; and
a valve pin continuously connected to a second end of the flexible barrier and extending in a downstream direction towards a mold gate, wherein the valve pin is movable in an upstream direction and in the downstream direction;
wherein the flexible barrier seals molding material in the manifold channel from an outside space.

22. The injection molding apparatus of claim 21, wherein the flexible barrier is generally cylindrical in shape and has at least one convolution.

23. The injection molding apparatus of claim 22 further comprising a support tube disposed within the flexible barrier, the support tube supporting the flexible barrier against collapse due to pressure of molding material.

24. The injection molding apparatus of claim 22, wherein the valve pin supports the flexible barrier against collapse due to pressure of molding material.

25. The injection molding apparatus of claim 21, wherein the flexible barrier is made of metal.

26. The injection molding apparatus of claim 21, wherein the flexible barrier is metallurgically connected to the bushing body and the valve pin.

27. The valve pin bushing assembly of claim 26, wherein the metallurgical connection is selected from the group consisting of a brazed connection, a welded connection, and a soldered connection.

28. The injection molding apparatus of claim 21, wherein the flexible barrier is mechanically connected to the bushing body and the valve pin.

29. An injection molding apparatus, comprising:
one or more plates;
an actuator connected to the one or more plates;
a manifold disposed among the one or more plates, the manifold having a manifold channel and a heater;
a nozzle connected to the manifold, the nozzle having a nozzle channel in communication with the manifold channel and a heater; and
a valve pin bushing assembly, comprising:
a bushing body secured to the manifold;
a generally cylindrical leak-proof flexible barrier continuously connected to the bushing body; and
a valve pin continuously connected to the flexible barrier and extending in a downstream direction towards a mold gate, wherein the valve pin is movable in an upstream direction and in the downstream direction to open and close the mold gate;
wherein the flexible barrier seals molding material in the manifold channel from an outside space.

* * * * *